United States Patent [19]

Wells

[11] 4,452,277
[45] Jun. 5, 1984

[54] AUTOMATIC, FLUID TIGHT COUPLING

[75] Inventor: Roger F. Wells, Simsbury, Conn.

[73] Assignee: United Technologies Corporation, Hartford, Conn.

[21] Appl. No.: 231,540

[22] Filed: Feb. 4, 1981

[51] Int. Cl.³ .............................................. F15D 1/02
[52] U.S. Cl. ....................................... 138/44; 138/40; 285/425; 285/10
[58] Field of Search ............... 138/40, 44; 285/9, 9 R, 285/31, 163, , 304, 305, 425, 10

[56] References Cited

U.S. PATENT DOCUMENTS

| | | | |
|---|---|---|---|
| 535,642 | 3/1895 | Thomson | 138/44 X |
| 1,305,668 | 6/1919 | Rieger et al. | 138/44 X |
| 2,095,899 | 10/1937 | Yancey | 138/44 X |
| 2,712,458 | 7/1955 | Lipson | 138/44 X |
| 2,842,962 | 7/1958 | Dall | 138/44 X |
| 3,009,716 | 11/1961 | Bradfute et al. | 285/10 |
| 3,018,799 | 1/1962 | Volkmonn et al. | 138/44 X |
| 3,226,505 | 12/1965 | Lucas et al. | 138/44 X |

FOREIGN PATENT DOCUMENTS 651622  4/1951  United Kingdom ................. 138/44

Primary Examiner—James E. Bryant, III
Attorney, Agent, or Firm—Dominic J. Chiantera

[57]   ABSTRACT

A fluid coupling includes inlet and outlet segments, each having a fluid carrying aperture with a major diameter fluid port at one end and a minor diameter coupling port at the other end of the segment longitudinal axis, the fluid ports being adapted for fluid communication with an associated fluid source and the coupling ports being adapted to receive each other in registration with engagement of the coupling ports by end to end abutment of the segments, the fluid apertures of the abutting segments, in tandem, forming a Venturi with the throat defined by the abutting coupling ports at the coupling interface, the coupling port minor diameter value being selected relative to the fluid port major diameter to provide a fluid pressure value at the coupling interface which is not greater than the outside ambient pressure, thereby preventing fluid escape to the ambient environment across the coupling interface.

1 Claim, 3 Drawing Figures

AUTOMATIC, FLUID TIGHT COUPLING

DESCRIPTION

1. Technical Field

This invention relates to fluid couplings and more particularly to fluid couplings with automatic engagement and release.

2. Background Art

Fluid couplings are used to convey a fluid between fluid sources, without leakage to the surrounding ambient. The fluid may be either liquid or gas, and the couplings either permanent (semipermanent) or temporary. The permanent type couplings are fixedly engaged and must be assembled and disassembled by hand. The temporary couplings are those in which the engagement is only for short intervals, such as the time required to complete the fluid transfer. While these temporary couplings may also be assembled and disassembled manually they typically include some type of automatic engagement and release.

In most coupling applications the quality of the transported fluid must be maintained, i.e. there cannot be contamination of the fluid by ambient constituants, in which case the coupling must provide some type of hermetically sealed coupling interface to prevent escape of internal fluid, and entrainment of ambient fluids. However, even in those applications where the fluid quality need not be maintained, but may be diluted, hermetically sealed couplings are still used to prevent fluid escape. This class of applications is that generally concerned with waste disposal, i.e. conveyance of waste fluid which if allowed to escape would contaminate and injure the surrounding environment.

The requirement for a hermetically sealed coupling interface limits, or at a minimum makes complex, the ability of the coupling to be automatically engaged and released, i.e. operated without manual assistance by an operator. The relative complexity of known automatic couplings, whatever the mechanical latching and release mechanism used to ensure a proper coupling seal, e.g. electromechanical solenoids, vacuum solenoids, etc., limit the reliability. The use of electromechanical, or pneumatic latching mechanisms, i.e. "active couplings" may also be limited in their applied use, e.g. not suitable for conveying combustible fluids, or the overall coupling response time may be undesirable for high speed applications.

DISCLOSURE OF INVENTION

One object of the present invention is to provide an automatic, passive fluid coupling for containing a fluid during transport between fluid sources in an ambient pressure environment.

According to the present invention, an automatic fluid coupling includes separate inlet and outlet segments, each segment having a fluid carrying aperture with a major diameter fluid mounting port at one end and a minor diameter coupling port at a distal end thereof in spaced registration along the segment longitudinal axis, each segment mounting port adapted for fluid communication with a fluid source, the coupling ports of each segment being adapted to engage each other during coupling by abutment of the distal ends to provide a coupling interface at which the abutting minor diameter coupling ports in combination provide the throat of a Venturi tube, the coupling port major diameter value selected relative to the mounting port minor diameter value to provide an aperture fluid pressure at the coupling interface which is not greater than the outside ambient pressure at the coupling interface, thereby preventing fluid escape to the ambient environment across the coupling interface. In further accord with the present invention the coupling ports of the segments, in combination, are adapted to receive each other in a male/female engagement at the coupling interface, whereby the coupling interface may be engaged and disengaged with automatic self-alignment of the coupling ports.

The automatic fluid coupling of the present invention provides a fluid tight connection for conveying fluid between sources without use of external sealing components, such as rings or gaskets for containing the fluid within the coupling. This results from formation of a Venturi-like aperture during engagement of the two segments in which, as defined by Bernoulli's equation for incompressible fluid flow, the restriction of the throat coupling interface reduces the fluid pressure to create a pressure gradient in a direction to prevent fluid escape across the coupling interface.

The coupling includes two segments which engage each other in a slip-fit relationship provided by a male/female type connection. This allows the segments to releasably engage each other by simple abutment (engage) or withdrawal (disengage) of the two segments at the interface. The non-hermeticity allows for the mating interface (coupling interface) to be loosely toleranced, while still providing containment of the fluid flow through the coupling. The loose tolerances and male/female connection allow the coupling to be easily engaged with self alignment of the segments to permit quick engagement and release. Furthermore, the simple geometry of the coupling segments allows for ease of manufacture at low cost. Selection of the segment material is based on the particular fluid application, e.g. causticity of the fluid and the maximum impact forces during engagement, to provide a coupling with a high degree of wearability in use without need for replacements of wear items such as seals or gaskets.

These and other objects, features, and advantages of the present invention will become more apparent in light of the following detailed description of a preferred embodiment thereof, as illustrated in the accompanying drawing.

BRIEF DESCRIPTION OF DRAWING(S)

BEST MODE FOR CARRYING OUT THE INVENTION

Figure 3:
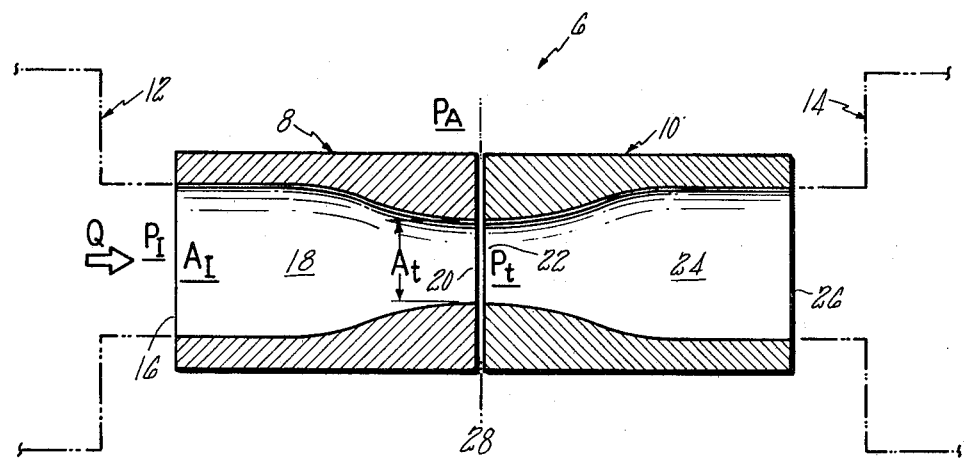
FIG. 3 is a simplified, cross section illustration of the fundamental characteristics of the present coupling, as used in the description of operation.

Referring first to FIG. 3, in a cutaway illustration of a fluid tight coupling according to the present invention, the coupling 6 comprises an inlet segment 8 and an outlet segment 10 for providing, when engaged, fluid communication between a fluid source 12 and a fluid "sink" 14 (each shown in phantom). As used here the term sink defines a fluid receiver or reservoir, and as with the inlet and outlet nomenclature for the coupling segments is intended only to infer a direction of fluid flow. The inlet segment 8 receives fluid at a major diameter fluid input port 16 and channels it through fluid carrying aperture 18 to a minor diameter fluid coupling port 20. When engaged the coupling port 20 is in registration with a like minor diameter coupling port 22 of the outlet segment 10, which includes fluid carrying aperture 24 in fluid communication with the coupling port 22 and a major diameter fluid output port 26 in fluid communication with the sink 14. Engaged, the coupling ports 20, 22 abut in registration along the coupling interface 28 to provide a non-hermetically sealed coupling between the segments.

In general either segment may receive or discharge the fluid; the two segments are interchangeable with respect to the direction of fluid flow. The fluid passage, or conduit through the coupling is provided by the registered central, longitudinal fluid apertures 18, 24 during engagement of the segments. As illustrated, the equal value minor diameter coupling ports are small than the major diameter input or output ports 16, 26. The narrow internal diameter of the coupling ports provide a restriction to the fluid flowing through the coupling.

Assuming an essentially steady, nonviscous flow of imcompressible fluid, the fluid flow characteristics may be described by Bernoulli's equation which requires that the sum of: the instantaneous fluid pressure (P), the kinetic fluid energy ($\frac{1}{2}\rho V^2$; $\rho$ is fluid density and V is fluid velocity), and static fluid energy ($\rho gy$; g is gravitational acceleration and y is vertical displacement in the plane of fluid flow) be constant along the conduit flow path. In FIG. 3 the coupling conduit lies in a common horizontal plane and the static energy is zero, in which case the sum of the instantaneous pressure and kinetic energy, or $P + \frac{1}{2}\rho V^2$ is constant. Assuming a constant fluid density ($\rho$) across the coupling, as the fluid velocity increases the fluid pressure decreases.

The fluid at the major diameter input port 16 with cross-sectional area $A_I$, is received at volumetric flow rate (Q) and fluid velocity ($v_I$) at the input port. The fluid velocity increases along the conduit flow path as the aperture internal cross-sectional area decreases (converging diameter) in the region of the restriction at the coupling interface 28 to a value $A_t$. This resembles a Venturi flow, with the restriction provided by the minor diameter coupling ports (20, 22) defining the throat of the Venturi. For the assumed incompressible flow, the fluid velocity at the throat ($v_t$) is greater than the velocity at the input port ($v_I$) in direct proportion to the ratio of the cross-sectional areas ($A_I/A_t$).

From Bernoulli's equation, the pressure differential between the fluid at the input port ($P_I$) and the coupling interface ($P_t$), i.e. $\Delta P = P_I - P_t$, is equal to $\Delta P = \frac{1}{2}\rho(V_t^2 - V_I^2)$. Since the fluid velocity at any point along the conduit may be expressed as the ratio of the volumetric flow (Q) divided by the instant cross-sectional area (A), then $$V_t = \frac{Q}{A_t} \text{ and } V_I = \frac{Q}{A_I}.$$

The cross-sectional area of the throat may then be defined in terms of $\Delta P$, the input cross-sectional area ($A_I$), the volumetric flow (Q), and the fluid density ($\rho$), or:

$$A_t = \frac{Q}{\sqrt{\frac{Q^2}{A_I^2} + \frac{2 \cdot \Delta P}{\rho}}} \quad \text{(Equation 1)}$$

The minor diameter value of the coupling ports 20, 22 is selected with respect to the major diameter value of the input port 16, so that the smaller cross-sectional area ($A_t$) which produces the increased fluid velocity at the coupling interface also limits the maximum fluid pressure at the interface to a value which is not greater than (equal to or less than) the ambient pressure surrounding the outside of the coupling. As a result the fluid flowing through the coupling cannot escape across the interface into the surrounding ambient due to the positive pressure gradient existing between the outside ambient and internal throat region; the source fluid is contained within the coupling despite the non-hermetic coupling interface. The fluid in the coupling may, however, be contaminated by entrainment of ambient fluid which is sucked into the internal aperture whenever the internal fluid pressure is less than the ambient pressure.

While contamination of the fluid is not permitted in most applications, the present coupling finds the highest utility in the transport of waste fluid from a source to a waste fluid disposal unit. In particular the ability to contain waste fluid without the need for a sealed interface which makes the present coupling particularly well suited for automated fluid waste disposal applications. One such application is the safe evacuation of exhaust gas from internal combustion (IC) engines to a central exhaust evacuation system. In particular, in the production line testing of newly manufactured engines, i.e. extra-vehicular "hot-test", where the engines are automatically shuttled from a production line into automated test cells, and connected in a combined automatic/manual procedure to the various engine services, exhaust discharge, and sensor connections. The present coupling allows automatic connection of the engine exhaust discharge to the central exhaust system. With present hot-test procedures having total test times of less than ten minutes the savings in time provided by an automatic exhaust connection is significant.

Figure 1:
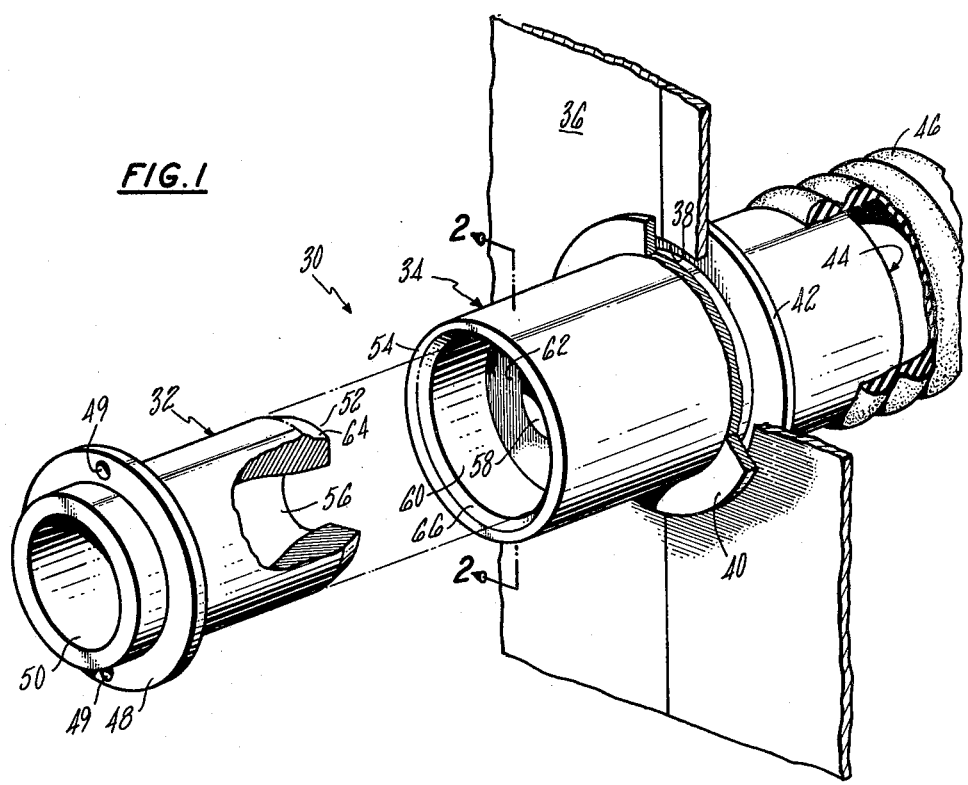
FIG. 1 is a perspective illustration of a best mode embodiment of the present invention, as may be used in an internal combustion (IC) engine exhaust evacuation application.

Referring now to FIG. 1, in a perspective illustration of a best mode embodiment of the present invention as used to couple exhaust gases from an engine exhaust manifold to a central exhaust evacuation system, an automatic coupling 30 has inlet and outlet segments 32, 34. The outlet segment 34 is fitted through a portion of the bulkhead 36 of the engine test cell enclosure, in a semifixed manner, by mounting the segment through a bulkhead aperture 38 having an internal diameter greater than the outer diameter of the segment. This allows the segment to "float" in its mounting with 360° of radial freedom. The radial motion allows for self-aligning of the outlet segment coupling port with the inlet segment coupling port during engagement. The segment is held in axial position in the bulkhead by mounting collars 40, 42 disposed on the outside surface of the segment; the bulkhead section being assembled in two halves around the segment body, between the collars. The coupling output port 44 (14, FIG. 3) is connected through a suitable conduit, such as a flexible hose 46 to the central exhaust system. The input segment 32 includes a mounting flange 48 for rigidly fixing (mounting) the segment to the particular fluid source, e.g. engine exhaust manifold to provide registration of the fluid input port 50 with the discharge from the manifold. The rigid mounting of the inlet segment and floating mount of the outlet segment allow the two to self align during engagement, which is provided by steering the engine on a conveyor apparatus into the test cell; the coupling being engaged by the placement of the engine adjacent the bulkhead 36 and disengaged by withdrawal of the engine from the cell.

It should be understood that the bulkhead mounting of the output segment 34, including the collars 40, 42 and flexible hose 46 is only illustrative of one of a number of mounting configurations which may be used, as known to those skilled in the art. Similarly the FIG. 1 embodiment of the present coupling illustrating fixed mounting of one segment and semifixed mounting of the other is only exemplary, and not intended as a limitation on the present coupling.

Figure 2:
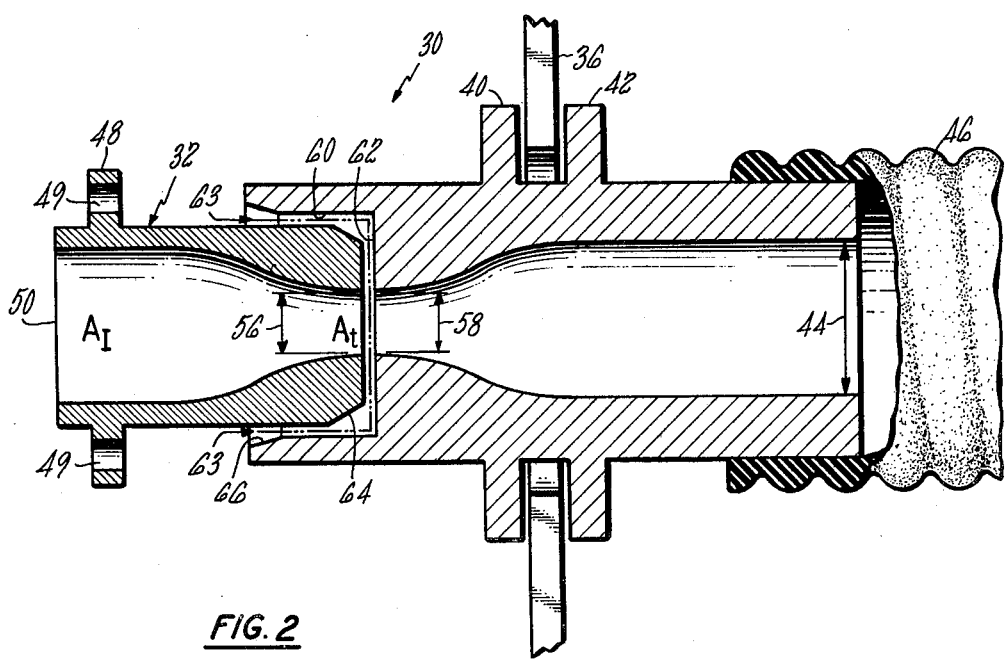
FIG. 2 is a cross sectioned, side-elevation of the perspective illustration of FIG. 1.

In the best mode embodiment the ends of the segments which engage each other, i.e. the ends 52, 54 which form the coupling interface, are provided with a male/female type connection. This allows the segments to releasably engage each other in a slip-fit fashion in which the two segments are maintained in spatial proximity with the coupling end 52 of the inlet segment 32 abutting the coupling end 54 of the outlet segment 34 as a result of the physical placement of the engine adjacent the bulkhead. With engagement the mounting end of the inlet segment is seated within a female cavity on the outlet segment mounting end which is formed by the interior side wall 60 and axial shoulder 62. The engaged coupling is more clearly illustrated in the cutaway illustration of FIG. 2, where the engagement forms the coupling interface (shown by phantom line 63) with the coupling port 56 of the segment 32 in registration with the coupling port 58 of the outlet segment 34.

As stated before the ability of the outlet segment to float with 360° of radial freedom facilitates automatic alignment of the two segments during the coupling phase. To further enhance the self-aligning engagement, the inlet segment 32 is provided with a chamfer 64 along the outer circumference of its mounting end and the outlet segment 34 includes a complimentary chamfer 66 along the sidewall 60. These two chamfers compensate for axial misalignment between the two segments during coupling, allowing the two segments to glide or skim across each other to permit insertion of the male mounting end into the female recess. Similarly, as illustrated in FIG. 1, the preferred coupling embodiment includes a cylindrical outer surface geometry for the two segments; this further enhancing the ability of the two segments to automatically engage each other.

The coupling material is whatever is deemed suitable for the particular fluid application, i.e. that suitable for conveying the particular fluid without deterioration of the coupling due to any caustic elements contaminants in the fluid. For application in conveying engine exhaust gases the segment material is preferably a high quality cast iron, having a low thermal coefficient of expansion to limit changes in tolerance fit due to the discharge temperatures of the gas. The cast iron allows for minimizing the coupling damage (especially the outlet segment 34) due to repeated engagement cycles; this particular coupling application results in a significant impact force between the segments during each coupling event. In addition, the cast iron is capable of withstanding the corrosive effects of the exhaust gas constituents. Once again, however, the particular type of material is dependent on the particular fluid application in which the coupling is used. In those applications where the fluid itself is noncaustic, or the application does not require repeated engagement/disengagement of the coupling so as to require high strength material lesser strength materials may be used, such as plastics.

Although the internal geometry of the fluid carrying aperture of the inlet segment (the converging cross-sectional area) is in the form of a Venturi tube, it need not have the fine converging taper of a Venturi tube which typically has an inlet converging taper in the shape of a Bellmouth designed with carefully rounded shoulders to eliminate fluid resistance and produce high aerodynamic efficiency. In the present coupling the converging taper is simply a piece-wise linear taper, i.e. no discontinuities. Since the coupling application is that of waste fluid transport, fluid pressure recovery downstream of the restricted throat portion is not of concern. Similarly, the converging portion and diverging portion (inlet/outlet) of a Venturi differ in length; the diverging portion taper is typically five times greater than that of the inlet or converging portion. This again is to allow for pressure recovery. This may also be provided in the present coupling, if pressure recovery is of concern, otherwise the two sections are substantially the same length.

In order to illustrate the calculation of the coupling port minor diameter value required to produce a fluid pressure at the coupling interface which is equal to, or less than ambient pressure, an example is given based on the application of the coupling as an exhaust gas conduit for an IC engine. The engine is assumed to have three cylinders, a 152 in$^3$ displacement, and an exhaust discharge port having a 1.5 inch outer diameter. The engine rated back pressure is $$212 \frac{\text{lb}}{\text{ft}^2}$$

at a rated engine speed (test measurement speed) of 3000 RPM. The fluid (exhaust gas) density at an assumed discharge temperature of 600° C. is $$\rho(600° \text{ C.}) = 0.0008 \frac{\text{slugs}}{\text{ft}^3}.$$

The fluid input port (50) major diameter is equal to the 1.5 inch outer diameter of the exhaust discharge port, and $A_I = 0.012$ ft$^2$. The volumetric flow at ambient temperature is $$Q_a = \frac{152 \text{ in}^3}{3} \cdot \frac{3000 \text{ RPM} \cdot \text{ft}^3}{12^3 \text{ in}^3} = 132 \frac{\text{ft}^3}{\text{min}}.$$

Assuming that the value of volumetric flow at the 600° C. exhaust gas temperature is proportional to the ratio of the temperatures multiplied by $Q_a$, i.e.

$$Q600° \text{ C.} = Q_a \frac{T(600° \text{ C.})}{T(AMB)}$$

where the ratioed temperatures are expressed in degrees Kelvin (°K), $$Q600° \text{ C.} = 393 \frac{\text{ft}^3}{\text{min}} = 6.55 \frac{\text{ft}^3}{\text{sec}}.$$

Substituting the values into the hereinbefore listed equation (1), with $$\Delta P = 212 \frac{\text{lb}}{\text{ft}^2}$$

(rated back pressure), the cross-sectional area of the coupling port is $A_t = 1.037$ in$^2$. The coupling port minor diameter value is 1.15 inches, approximately 76% that of the fluid port major diameter.

Since the rated back pressure value is the difference gauge pressure between the inlet fluid pressure ($P_I$) at the input port 50 and ambient ($P_A$), i.e.

$$\Delta P = 212 \frac{\text{lb}}{\text{ft}^2} = P_I - P_A,$$

then the minor diameter value of 1.15 inches results in a fluid pressure at the throat ($P_t$) which is ideally equal to ambient ($P_t = P_A$). Of course coupling tolerances, ambient changes, and additional friction head losses have not been considered in the example, but would be taken into account in a given application to ensure a maximum $P_t$ value which is not greater than $P_A$.

For engine speeds less than the rated speed the volumetric flow Q decreases proportionately. At the same time fluid input pressure ($P_I$) and fluid density also decrease and, with the friction head losses at the lower speeds ($\Delta P$), the resulting pressure at the throat ($P_t$) is less than that at the rated speed condition, for the same minor diameter value of 1.15 inches ($P_t < P_A$). As a result ambient fluid (air) is drawn into the exhaust at the coupling interface, but the exhaust itself is contained within the coupling.

Although the invention has been shown and described with respect to a best mode embodiment thereof, it should be understood by those skilled in the art that the invention may be practiced in a wide variety of configurations and utilizations, some of which are described hereinbefore, and that the foregoing and various other changes, omissions and additions may be made in and to the invention without departing from the spirit and the scope thereof.

I claim:

1. A fluid coupling for transporting fluid through an ambient pressure environment between fluid sources, comprising first and second segments, each comprising a fluid carrying aperture with a major diameter mounting port at one end and a minor diameter coupling port at a distal end thereof, said mounting ports each adapted for fluid communication with a fluid source, said first segment coupling port disposed in an end wall of a cylindrical cavity in said first segment distal end and said second segment coupling port disposed in an end wall of a cylindrical probe in said second segment distal end, said probe and cavity each having complementary chamfered edges to assist in aligning said probe for insertion into said cavity, said probe adapted for releasably engaging said cavity in coupling of said distal ends to provide registration of said coupling ports at a coupling interface to form a venturi comprised of the fluid carrying apertures of the coupled segments, said engaged coupling ports forming the throat of said venturi, each with equal minor diameters selected to provide an aperture fluid pressure at said coupling interface which is not greater than the outside ambient pressure, thereby preventing fluid escape therefrom.

* * * * *